(12) United States Patent
Kim et al.

(10) Patent No.: US 11,112,864 B2
(45) Date of Patent: Sep. 7, 2021

(54) DISPLAY DEVICE AND DISPLAY SYSTEM INCLUDING THE SAME

(71) Applicant: Samsung Display Co., Ltd., Yongin-si (KR)

(72) Inventors: Kyungman Kim, Suwon-si (KR); Donggyu Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/256,191

(22) Filed: Jan. 24, 2019

(65) Prior Publication Data

US 2019/0250706 A1    Aug. 15, 2019

(30) Foreign Application Priority Data

Feb. 13, 2018  (KR) ........................ 10-2018-0017487

(51) Int. Cl.
*G06F 3/147*   (2006.01)
*G06F 3/01*    (2006.01)
*G09G 5/391*   (2006.01)

(52) U.S. Cl.
CPC .............. *G06F 3/013* (2013.01); *G06F 3/147* (2013.01); *G09G 5/391* (2013.01); *G09G 2320/0261* (2013.01); *G09G 2340/0407* (2013.01); *G09G 2340/0442* (2013.01); *G09G 2354/00* (2013.01)

(58) Field of Classification Search
CPC ........... G09G 5/391; G09G 2320/0261; G09G 2340/0442; G09G 2354/00; G09G 2340/0407; G06F 3/013; G06F 3/147
See application file for complete search history.

(56) References Cited

U.S. PATENT DOCUMENTS

| 5,751,259 A  * | 5/1998  | Iwamoto .................. G06F 3/011 345/8 |
| 2017/0302972 A1 | 10/2017 | Zhang et al. |
| 2019/0005884 A1* | 1/2019 | Yoo ......................... G06F 3/011 |
| 2020/0120322 A1* | 4/2020 | Ogasawara .......... H04N 13/122 |

FOREIGN PATENT DOCUMENTS

| KR | 10-2017-0004816 A | 1/2017 |
| KR | 10-2017-0016753 A | 2/2017 |
| KR | 10-2017-0088181 A | 8/2017 |

* cited by examiner

*Primary Examiner* — Towfiq Elahi
(74) *Attorney, Agent, or Firm* — Lewis Roca Rothgerber Christie LLP

(57) ABSTRACT

A display device includes: a display panel configured to display a first image having a first resolution; and a display panel driving circuit configured to drive the display panel, wherein the display panel driving circuit is configured to receive image data corresponding to a second image having a second resolution that is higher than the first resolution, to receive gaze data indicating a user's gaze, to select partial image data which reflects the user's gaze from the image data based on the gaze data, and to drive the display panel to display the first image based on the partial image data.

20 Claims, 13 Drawing Sheets

DISPLAY DEVICE AND DISPLAY SYSTEM INCLUDING THE SAME

CROSS-REFERENCE TO RELATED APPLICATION

This application claims priority to and the benefit of Korean Patent Application No. 10-2018-0017487, filed on Feb. 13, 2018 in the Korean Intellectual Property Office (KIPO), the content of which is incorporated herein in its entirety by reference.

BACKGROUND

1. Field

Aspects of some example embodiments relate generally to a display device.

2. Description of the Related Art

Recently, as consumers' demand for virtual reality increases, many manufacturers have been developing a display system which enables a user to experience the virtual reality (e.g., an HMD system, a VR system, etc.). Generally, the viewer wears a glasses-like display system and watches an image displayed by a display device included in the glasses-like display system to experience the virtual reality. Here, the display device included in the glasses-like display system is required to display the image with respect to (or, around) a user's gaze (or, line of sight). In other words, the display device included in the glasses-like display system is required to display an image which reflects the user's gaze.

Thus, in a display system, a gaze detecting sensor may generate a gate detection signal by detecting the user's gaze, a processing unit (e.g., a central processing unit (CPU), an application processor (AP), etc.) generates user's gaze data based on the gaze detection signal, a graphic processing unit (GPU) generates (or, performs rendering) image data which reflects the user's gaze based on the user's gaze data, and a display device receives the image data from the graphic processing unit to display an image which reflects the user's gaze. In the display system, after the user's gaze is changed, the image data may be generated by reflecting the changed user's gaze. Thus, a specific delay (e.g., latency) due to image data rendering may occur between a time point at which the user's gaze is changed and a time point at which the image which reflects the changed user's gaze is displayed. As a result, the user may feel dizziness due to the delay when experiencing the virtual reality. For example, because the delay due to the image data rendering, which corresponds to at least one image frame, occurs between the time point at which the user's gaze is changed and the time point at which the image which reflects the changed user's gaze is displayed in the related art display system, a delay corresponding to at least 16.6 microseconds (ms) may occur when a display device included in the related art display system operates at 60 hertz (Hz).

The above information disclosed in this Background section is only for enhancement of understanding of the background of the invention and therefore it may contain information that does not constitute prior art.

SUMMARY

Aspects of some example embodiments relate generally to a display device. For example, some example embodiments of the present inventive concept relate to a display device capable of displaying an image which reflects a user's gaze and a display system including the display device (e.g., a head mounted display (HMD) system, a virtual reality (VR) system, etc.).

Some example embodiments may include a display device that can prevent or reduce a delay due to image data rendering of a graphic processing unit from occurring between a time point at which a user's gaze is changed and a time point at which an image which reflects the changed user's gaze is displayed.

Some example embodiments may include a display system including the display device.

According to an aspect of example embodiments, a display device may include a display panel configured to display a first image having a first resolution and a display panel driving circuit configured to drive the display panel. Here, the display panel driving circuit may receive image data corresponding to a second image having a second resolution that is higher than the first resolution, may receive user's gaze data indicating a user's gaze, may select partial image data which reflects the user's gaze from the image data based on the user's gaze data, and may drive the display panel to display the first image based on the partial image data.

In some example embodiments, the display panel driving circuit may select the partial image data to locate the user's gaze in a central region of the first image.

In some example embodiments, horizontal center coordinates of the partial image data may be determined as the user's gaze moves in a horizontal direction on the display panel.

In some example embodiments, the horizontal center coordinates may not move when the user's gaze is located in a predetermined central region of the display panel.

In some example embodiments, the horizontal center coordinates may move to the left when the user's gaze moves to the left beyond the predetermined central region of the display panel.

In some example embodiments, the horizontal center coordinates may move to the right when the user's gaze moves to the right beyond the predetermined central region of the display panel.

In some example embodiments, vertical center coordinates of the partial image data may be determined as the user's gaze moves in a vertical direction on the display panel.

In some example embodiments, the vertical center coordinates may not move when the user's gaze is located in a predetermined central region of the display panel.

In some example embodiments, the vertical center coordinates may move upwardly when the user's gaze moves upwardly beyond the predetermined central region of the display panel.

In some example embodiments, the vertical center coordinates may move downwardly when the user's gaze moves downwardly beyond the predetermined central region of the display panel.

According to an aspect of example embodiments, a display system may include a display device configured to output a first image having a first resolution, a gaze detecting sensor configured to detect a user's gaze to generate a gaze detection signal, a processing unit configured to generate user's gaze data indicating the user's gaze based on the gaze detection signal, and a graphic processing unit configured to generate image data corresponding to a second image having a second resolution that is higher than the first resolution.

Here, the display device may receive the user's gaze data from the processing unit, may receive the image data from the graphic processing unit, and may output the first image by reflecting the user's gaze based on the user's gaze data and the image data.

In some example embodiments, the display device may provide information relating to the user's gaze data or information relating to the user's gaze which the first image reflects to the graphic processing unit.

In some example embodiments, the display device may include a display panel configured to display the first image and a display panel driving circuit configured to receive the image data, to receive the user's gaze data, to select partial image data which reflects the user's gaze from the image data based on the user's gaze data, and to drive the display panel to display the first image based on the partial image data.

In some example embodiments, the display panel driving circuit may select the partial image data to locate the user's gaze in a central region of the first image.

In some example embodiments, horizontal center coordinates of the partial image data may be determined as the user's gaze moves in a horizontal direction on the display panel.

In some example embodiments, the horizontal center coordinates may not move when the user's gaze is located in a predetermined central region of the display panel.

In some example embodiments, the horizontal center coordinates may move to the left when the user's gaze moves to the left beyond the predetermined central region of the display panel.

In some example embodiments, the horizontal center coordinates may move to the right when the user's gaze moves to the right beyond the predetermined central region of the display panel.

In some example embodiments, vertical center coordinates of the partial image data may be determined as the user's gaze moves in a vertical direction on the display panel.

In some example embodiments, the vertical center coordinates may not move when the user's gaze is located in a predetermined central region of the display panel.

In some example embodiments, the vertical center coordinates may move upwardly when the user's gaze moves upwardly beyond the predetermined central region of the display panel.

In some example embodiments, the vertical center coordinates may move downwardly when the user's gaze moves downwardly beyond the predetermined central region of the display panel.

Therefore, a display device according to some example embodiments may prevent or reduce a delay due to image data rendering of a graphic processing unit from occurring between a time point at which a user's gaze is changed and a time point at which an image which reflects the changed user's gaze is displayed by controlling a display panel driving circuit to receive image data corresponding to a second image having a resolution (e.g., a second resolution) that is higher than a resolution (e.g., a first resolution) of a first image to be displayed on a display panel, to receive user's gaze data indicating a user's gaze, to select partial image data which reflects the user's gaze from the image data based on the user's gaze data, and to drive the display panel to display the first image based on the partial image data.

In addition, a display system including the display device according to some example embodiments may prevent or reduce instances of a user feeling dizziness due to a gaze-change in experiencing virtual reality.

BRIEF DESCRIPTION OF THE DRAWINGS

Illustrative, non-limiting example embodiments will be more clearly understood from the following detailed description in conjunction with the accompanying drawings.

DETAILED DESCRIPTION

Hereinafter, aspects of some example embodiments of the present inventive concept will be explained in more detail with reference to the accompanying drawings.

Figure 1:
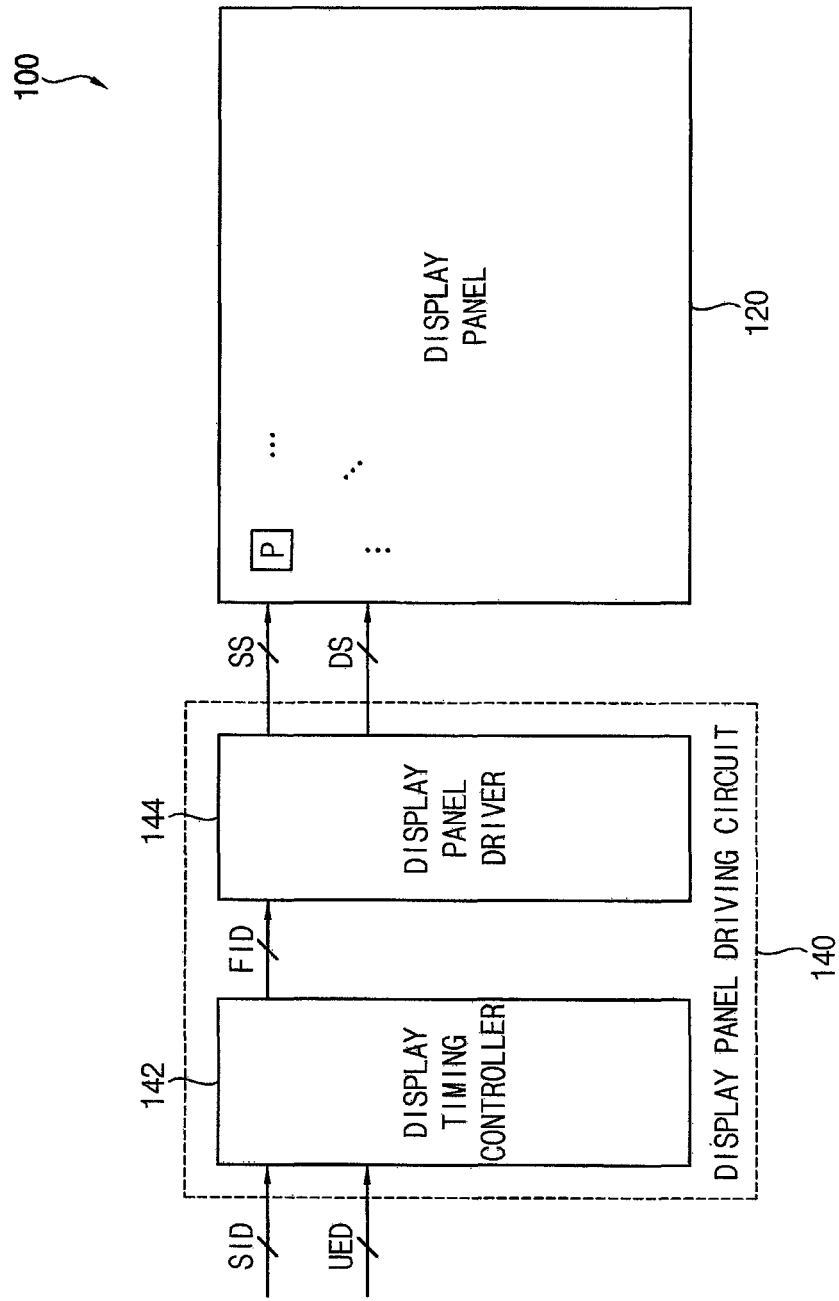
FIG. 1 is a block diagram illustrating a display device according to some example embodiments.
Figure 2:
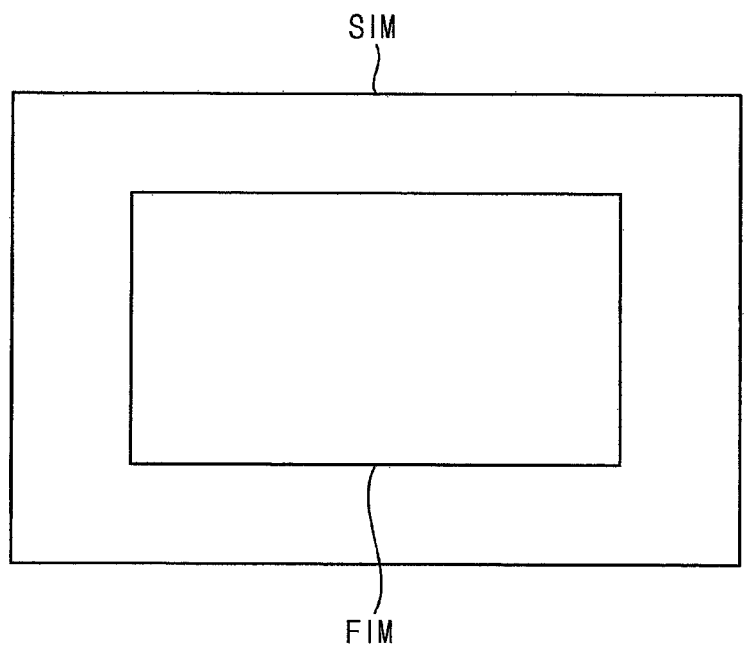
FIG. 2 is a diagram for describing a process in which the display device of FIG. 1 displays a first image which reflects a user's gaze.

FIG. 1 is a block diagram illustrating a display device according to some example embodiments, and FIG. 2 is a diagram for describing a process in which the display device of FIG. 1 displays a first image which reflects a user's gaze.

Referring to FIGS. 1 and 2, the display device 100 may include a display panel 120 and a display panel driving circuit 140. Here, the display panel driving circuit 140 may include a display timing controller 142 and a display panel driver 144 (e.g., a scan driver and a data driver).

The display panel 120 may include a plurality of pixel circuits P. In an example embodiment, the display panel 120 may be a liquid crystal display (LCD) panel. In this case, each of the pixel circuits P may include a liquid crystal element. In another example embodiment, the display panel 120 may be an organic light emitting display (OLED) panel. In this case, each of the pixel circuits P may include a light emitting element (e.g., an organic light emitting diode, etc). In some example embodiments, the pixel circuits P may be arranged in various forms in the display panel 120. The display panel 120 may display a first image FIM having a first resolution using the pixel circuits P. The display panel 120 may be connected to the display panel driver 144 included in the display panel driving circuit 140. The display panel 120 may display the first image FIM having the first resolution in response to a data signal DS and a scan signal SS provided from the display panel driver 144. The display panel driving circuit 140 may drive the display panel 120. The display panel driving circuit 140 may be connected to the display panel 120 via data-lines. Thus, the display panel driving circuit 140 may provide the data signal DS to the display panel 120 via the data-lines. In an example embodiment, when the first resolution of the first image FIM is m×n, where m and n are integers greater than or equal to 1, the number of the data-lines may be m. For example, when the first resolution of the first image FIM is 1920×1080, the number of the data-lines may be 1920. The display panel driving circuit 140 may be connected to the display panel 120 via scan-lines. Thus, the display panel driving circuit 140 may provide the scan signal SS to the display panel 120 via the scan-lines. In an example embodiment, when the first resolution of the first image FIM is m×n, the number of the scan-lines may be n. For example, when the first resolution of the first image FIM is 1920×1080, the number of the scan-lines may be 1080. In brief, the display panel driving circuit 140 may control the display panel 120 to display the first image FIM having the first resolution by providing the data signal DS and the scan signal SS to the display panel 120.

In some example embodiments, the display panel driving circuit 140 may receive image data SID corresponding to a second image SIM having a second resolution that is higher than the first resolution of the first image FIM. For example, a graphic processing unit may generate the image data SID corresponding to the second image SIM having the second resolution. Thus, the display panel driving circuit 140 may receive the image data SID corresponding to the second image SIM having the second resolution from the graphic processing unit. The graphic processing unit may not generate (e.g., perform rendering) image data corresponding to the first image FIM having the first resolution, which the display device 100 outputs (e.g., the display panel 140 displays). That is, the graphic processing unit may generate the image data SID corresponding to the second image SIM having the second resolution that is bigger than the image data corresponding to the first image FIM having the first resolution. Thus, the display device 100 may select partial image data FID from the image data SID and may perform a displaying operation based on the partial image data FID corresponding to the first image FIM having the first resolution. In addition, the display panel driving circuit 140 may receive user's gaze data UED indicating a user's gaze. For example, a gaze detecting sensor may generate a gaze detection signal by detecting the user's gaze, and a processing unit may generate the user's gaze data UED based on the gaze detection signal. Thus, the display panel driving circuit 140 may receive the user's gaze data UED from the processing unit. In brief, the display device 100 directly receives the user's gaze data UED and determines the image data which reflects the user's gaze (e.g., the partial image data FID), whereas a related art display device may receive the image data which reflects the user's gaze from the graphic processing unit (e.g., the graphic processing unit receives the user's gaze data UED and determines the image data which reflects the user's gaze). In other words, the graphic processing unit of the present inventive concept does not receive the user's gaze data UED.

Subsequently, the display panel driving circuit 140 may select the partial image data FID which reflects the user's gaze from the image data SID based on the user's gaze data UED. For example, the display panel driving circuit 140 may grasp (or, obtain) the user's gaze based on the user's gaze data UED and may select the partial image data FID (e.g., corresponding to the first image FIM) from the image data SID (e.g., corresponding to the second image SIM), where the partial image data FID corresponds to a given region around the user's gaze. In an example embodiment, the display panel driving circuit 140 may select the partial image data FID to locate the user's gaze in the central region of the first image FIM. In some example embodiments, the user's gaze may be located at a center of the first image FIM. In some example embodiments, the user's gaze may be located at any position in the central region of the first image FIM. For example, when the user's gaze is located at the center of the first image FIM, when the coordinates of the user's gaze on the second image SIM are (x, y), and when the first resolution of the first image FIM is m×n, the partial image data FID corresponding to a region defined by a horizontal coordinates section between x−(m/2) and x+(m/2) on the second image SIM and a vertical coordinates section between y−(n/2) and y+(n/2) on the second image SIM may be selected from the image data SID. However, a method of selecting the partial image data FID from the image data SID is not limited thereto. Next, the display panel driving circuit 140 may drive the display panel 120 to display the first image FIM having the first resolution based on the partial image data FID. For example, the display panel driving circuit 140 may generate the data signal DS and the scan signal SS for displaying only the first image FIM among the second image SIM and may provide the data signal DS and the scan signal SS to the display panel 120.

In an example embodiment, as the user's gaze moves in a horizontal direction (or, a left-right direction) on the display panel 120, the horizontal center coordinates of the partial image data FID corresponding to the first image FIM may be determined. For example, the display panel driving circuit 140 may move the horizontal center coordinates of the partial image data FID corresponding to the first image FIM to the left when the user's gaze moves to the left on the display panel 120 and may move the horizontal center coordinates of the partial image data FID corresponding to the first image FIM to the right when the user's gaze moves to the right on the display panel 120. In some example embodiments, although the user's gaze moves in the horizontal direction on the display panel 120, the display panel driving circuit 140 may not move the horizontal center coordinates of the partial image data FID corresponding to the first image FIM if the movement is not large. Specifically, when the user's gaze is located in a predetermined central region of the display panel 120, the horizontal center coordinates of the partial image data FID corresponding to the first image FIM may not move. In addition, when the user's gaze moves to the left beyond the predetermined central region of the display panel 120, the horizontal center coordinates of the partial image data FID corresponding to the first image FIM may move to the left. Furthermore, when the user's gaze moves to the right beyond the predetermined central region of the display panel 120, the horizontal center coordinates of the partial image data FID corresponding to the first image FIM may move to the right. Here, the predetermined central region may be changed according to requirements for the display device 100. For example, when it is not required to move the horizontal center coordinates of the partial image data FID corresponding to the first image FIM for the small change of the user's gaze, the predetermined central region may become larger. On the other hand, when it is required to move the horizontal center coordinates of the partial image data FID corresponding to the first image FIM for even the small change of the user's gaze, the predetermined central region may become smaller.

In an example embodiment, as the user's gaze moves in a vertical direction (or, a top-bottom direction) on the display panel 120, the vertical center coordinates of the partial image data FID corresponding to the first image FIM may be determined. For example, the display panel driving circuit 140 may move the vertical center coordinates of the partial image data FID corresponding to the first image FIM upwardly when the user's gaze moves upwardly on the display panel 120 and may move the vertical center coordinates of the partial image data FID corresponding to the first image FIM downwardly when the user's gaze moves downwardly on the display panel 120. In some example embodiments, although the user's gaze moves in the vertical direction on the display panel 120, the display panel driving circuit 140 may not move the vertical center coordinates of the partial image data FID corresponding to the first image FIM if the movement is not large. Specifically, when the user's gaze is located in a predetermined central region of the display panel 120, the vertical center coordinates of the partial image data FID corresponding to the first image FIM may not move. In addition, when the user's gaze moves upwardly beyond the predetermined central region of the display panel 120, the vertical center coordinates of the partial image data FID corresponding to the first image FIM may move upwardly. Furthermore, when the user's gaze moves downwardly beyond the predetermined central region of the display panel 120, the vertical center coordinates of the partial image data FID corresponding to the first image FIM may move downwardly. Here, the predetermined central region may be changed according to requirements for the display device 100. For example, when it is not required to move the vertical center coordinates of the partial image data FID corresponding to the first image FIM for the small change of the user's gaze, the predetermined central region may become larger. On the other hand, when it is required to move the vertical center coordinates of the partial image data FID corresponding to the first image FIM for even the small change of the user's gaze, the predetermined central region may become smaller.

As described above, the display device 100 may effectively prevent or reduce the delay due to the image data rendering of the graphic processing unit from occurring between the time point at which the user's gaze is changed and the time point at which the image which reflects the changed user's gaze is displayed by receiving the image data SID corresponding to the second image SIM having the resolution (e.g., the second resolution) that is higher than the resolution (e.g., the first resolution) of the first image FIM to be displayed on the display panel 120, by receiving the user's gaze data UED indicating the user's gaze, by selecting the partial image data FID which reflects the user's gaze from the image data SID based on the user's gaze data UED, and by displaying the first image FIM based on the partial image data FID. In other words, the display device 100 may not require the graphic processing unit to generate (e.g., perform the rendering) the image which reflects the changed user's gaze. Thus, the graphic processing unit of the present inventive concept may generate the image data SID to provide the image data SID to the display device 100, regardless of the change of the user's gaze. In brief, the display device 100 may implement the image which reflects the user's gaze (e.g., the first image FIM) in a simple way by directly receiving the user's gaze data UED and by selecting the partial image data FID corresponding to the first image FIM having the first resolution from the image data SID received from the graphic processing unit. As a result, the display device 100 may respond to the change of the user's gaze quickly as compared to a related art display device and thus may prevent or reduce instances of the user feeling the dizziness due to the gaze-change in experiencing the virtual reality. For convenience of description, although it is illustrated in FIG. 1 that the display device 100 includes only the display panel 120 and the display panel driving circuit 140 (e.g., including the display timing controller 142 and the display panel driver 144), it should be understood that the display device 100 may further include other components (e.g., a processor, a frame buffer memory device, a line buffer memory device, etc).

Figure 3A:
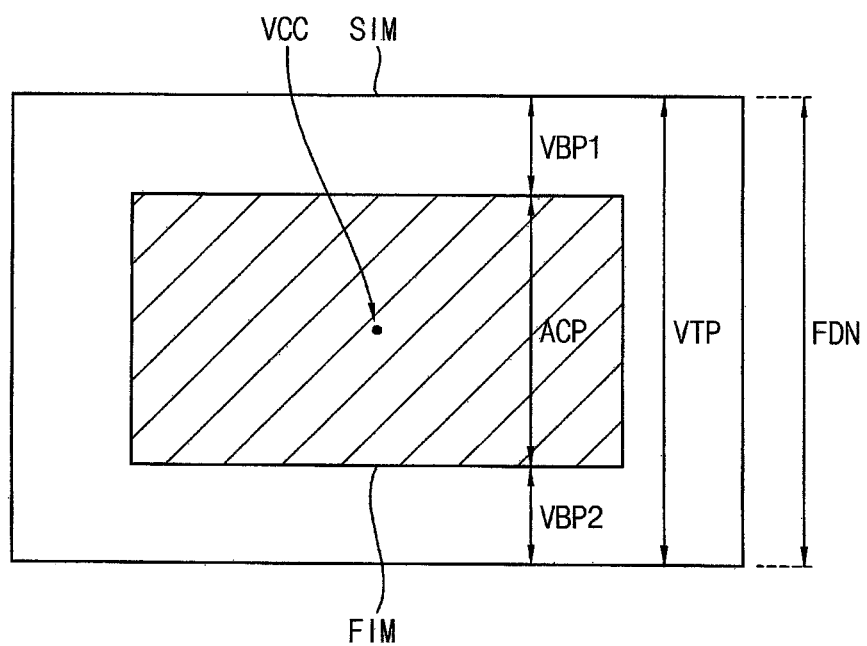
FIGS. 3A and 3B are diagrams illustrating an example in which the display device of FIG. 1 selects a first image from a second image in a vertical direction when a user views a central region of a display panel.
Figure 3B:
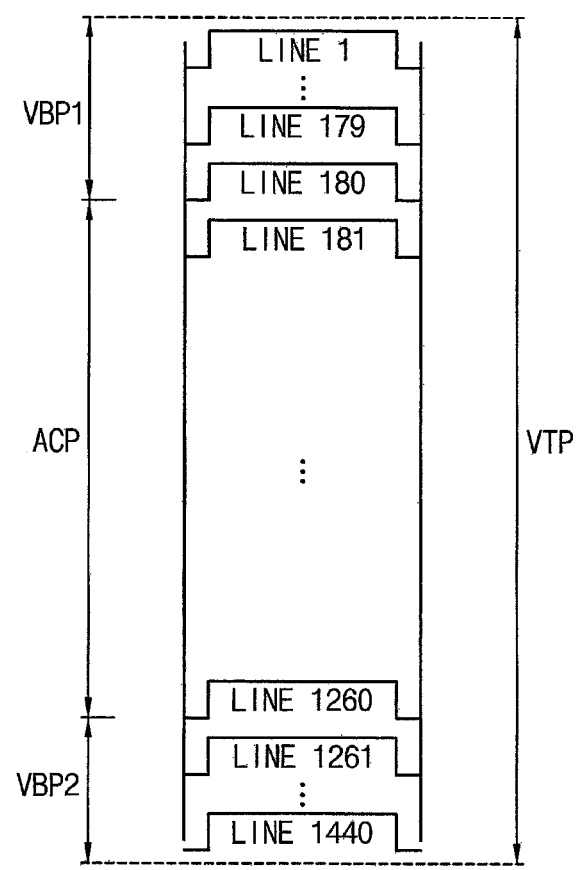

FIGS. 3A and 3B are diagrams illustrating an example in which the display device of FIG. 1 selects a first image from a second image in a vertical direction when a user views a central region of a display panel.

Referring to FIGS. 3A and 3B, as the user's gaze moves in the vertical direction FDN on the display panel 120, the vertical center coordinates VCC of the partial image data FID corresponding to the first image FIM may be determined. FIGS. 3A and 3B show an example in which the vertical center coordinates VCC of the partial image data FID corresponding to the first image FIM do not move when the user's gaze is located in the predetermined central region of the display panel 120. Here, it is illustrated in FIGS. 3A and 3B that the first resolution of the first image FIM is 1920×1080 and the second resolution of the second image SIM is 2560×1440. For example, it is assumed in FIGS. 3A and 3B that the first image FIM includes 1920 vertical lines and 1080 horizontal lines and the second image SIM includes 2560 vertical lines and 1440 horizontal lines. As described above, the display panel driving circuit 140 may receive the image data SID corresponding to the second image SIM having the second resolution, may receive the user's gaze data UED indicating the user's gaze, and may select the partial image data FID which reflects the user's gaze from the image data SID based on the user's gaze data UED. Thus, a vertical direction region VTP of the image data SID corresponding to the second image SIM may be divided into a first vertical blank region VBP1, an active region ACP, and a second vertical blank region VBP2, and the active region ACP may be determined as the partial image data FID corresponding to the first image FIM. Here, because the user's gaze is located in the predetermined central region of the display panel 120, the vertical center coordinates VCC of the partial image data FID corresponding to the first image FIM may not move. Thus, the first vertical blank region VBP1 may have the same size as the second vertical blank region VBP2. Hence, 1st through 180th horizontal lines Line 1 through Line 180 of the second image SIM may belong to the first vertical blank region VBP1, 1261st through 1440th horizontal lines Line 1261 through Line 1440 of the second image SIM may belong to the second vertical blank region VBP2, and 181st through 1260th horizontal lines Line 181 through Line 1260 of the second image SIM may belong to the active region ACP. In other words, the first vertical blank region VBP1 may include 180 horizontal lines Line 1 through Line 180, the second vertical blank region VBP2 may include 180 horizontal lines Line 1261 through Line 1440, and the active region ACP may include 1080 horizontal lines Line 181 through Line 1260. As a result, the display panel driving circuit 140 may select the partial image data FID corresponding to the first image FIM from the image data SID corresponding to the second image SIM by corresponding (or, matching) the 181st through 1260th horizontal lines Line 181 through Line 1260 (e.g., belonging to the active region ACP) of the second image SIM to 1st through 1080th horizontal lines of the first image FIM.

Figure 4A:
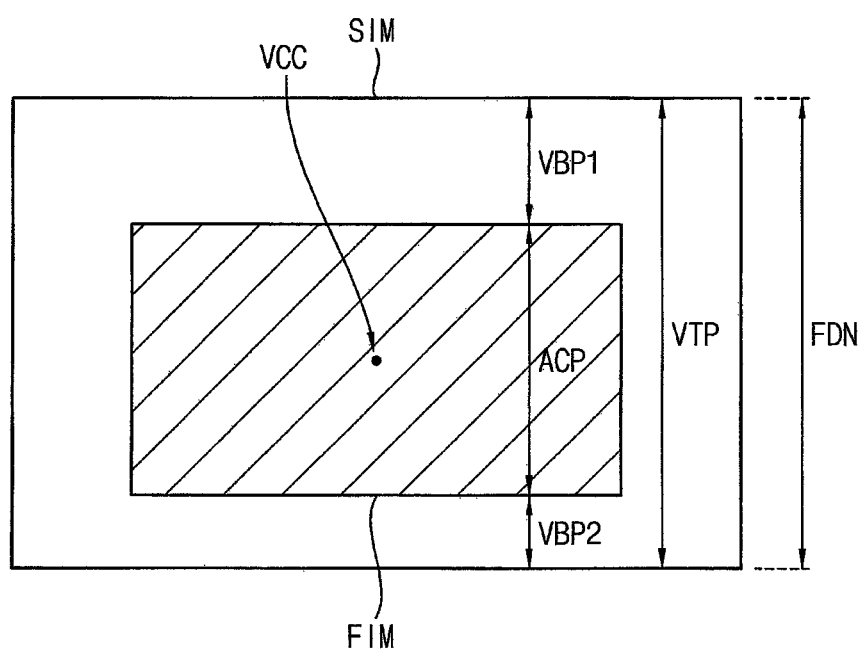
FIGS. 4A and 4B are diagrams illustrating an example in which the display device of FIG. 1 selects a first image from a second image in a vertical direction when a user views a lower region of a display panel.
Figure 4B:
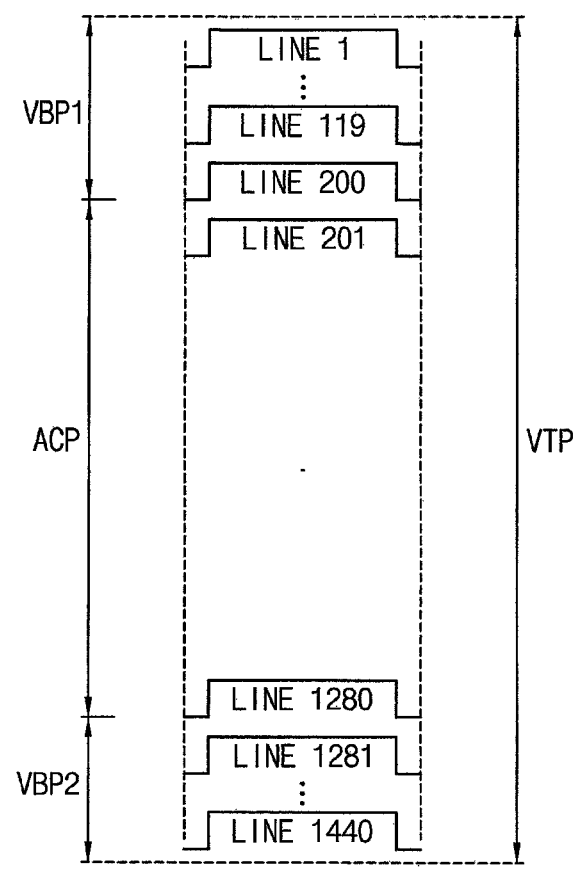

FIGS. 4A and 4B are diagrams illustrating an example in which the display device of FIG. 1 selects a first image from a second image in a vertical direction when a user views a lower region of a display panel.

Referring to FIGS. 4A and 4B, as the user's gaze moves in the vertical direction FDN on the display panel 120, the vertical center coordinates VCC of the partial image data FID corresponding to the first image FIM may be determined. FIGS. 4A and 4B show an example in which the vertical center coordinates VCC of the partial image data FID corresponding to the first image FIM move downwardly when the user's gaze moves downwardly beyond the predetermined central region of the display panel 120. Here, it is illustrated in FIGS. 4A and 4B that the first resolution of the first image FIM is 1920×1080 and the second resolution of the second image SIM is 2560×1440. For example, it is assumed in FIGS. 4A and 4B that the first image FIM includes 1920 vertical lines and 1080 horizontal lines and the second image SIM includes 2560 vertical lines and 1440 horizontal lines. As described above, the display panel driving circuit 140 may receive the image data SID corresponding to the second image SIM having the second resolution, may receive the user's gaze data UED indicating the user's gaze, and may select the partial image data FID which reflects the user's gaze from the image data SID based on the user's gaze data UED. Thus, a vertical direction region VTP of the image data SID corresponding to the second image SIM may be divided into a first vertical blank region VBP1, an active region ACP, and a second vertical blank region VBP2, and the active region ACP may be determined as the partial image data FID corresponding to the first image FIM. Here, as the user's gaze moves downwardly beyond the predetermined central region of the display panel 120, the vertical center coordinates VCC of the partial image data FID corresponding to the first image FIM may move downwardly. Thus, the first vertical blank region VBP1 may have a size that is bigger than that of the second vertical blank region VBP2. Hence, 1st through 200th horizontal lines Line 1 through Line 200 of the second image SIM may belong to the first vertical blank region VBP1, 1281st through 1440th horizontal lines Line 1281 through Line 1440 of the second image SIM may belong to the second vertical blank region VBP2, and 201st through 1280th horizontal lines Line 201 through Line 1280 of the second image SIM may belong to the active region ACP. In other words, the first vertical blank region VBP1 may include 200 horizontal lines Line 1 through Line 200, the second vertical blank region VBP2 may include 160 horizontal lines Line 1281 through Line 1440, and the active region ACP may include 1080 horizontal lines Line 201 through Line 1280. As a result, the display panel driving circuit 140 may select the partial image data FID corresponding to the first image FIM from the image data SID corresponding to the second image SIM by corresponding (or, matching) the 201st through 1280th horizontal lines Line 201 through Line 1280 (e.g., belonging to the active region ACP) of the second image SIM to 1st through 1080th horizontal lines of the first image FIM.

Figure 5A:
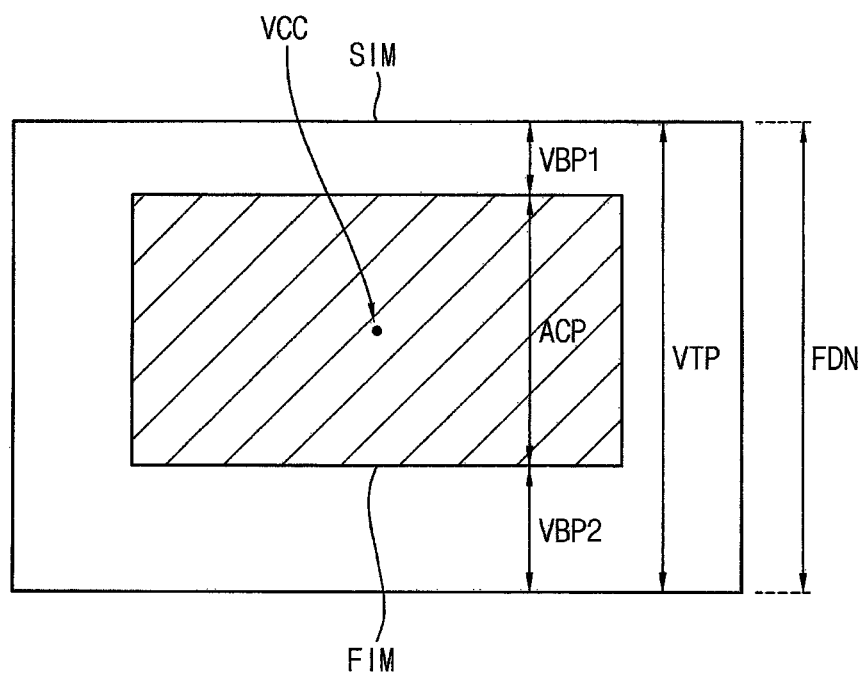
FIGS. 5A and 5B are diagrams illustrating an example in which the display device of FIG. 1 selects a first image from a second image in a vertical direction when a user views an upper region of a display panel.
Figure 5B:
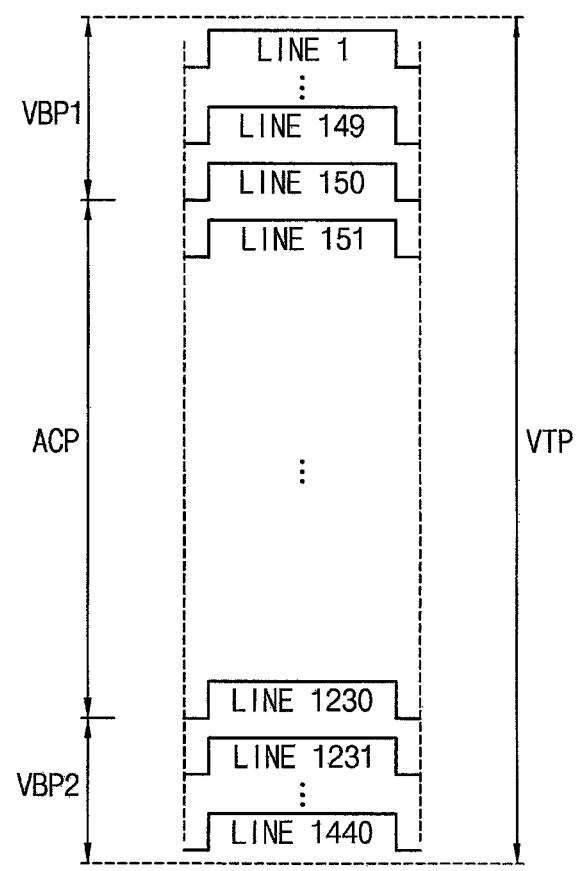

FIGS. 5A and 5B are diagrams illustrating an example in which the display device of FIG. 1 selects a first image from a second image in a vertical direction when a user views an upper region of a display panel.

Referring to FIGS. 5A and 5B, as the user's gaze moves in the vertical direction FDN on the display panel 120, the vertical center coordinates VCC of the partial image data FID corresponding to the first image FIM may be determined. FIGS. 5A and 5B show an example in which the vertical center coordinates VCC of the partial image data FID corresponding to the first image FIM move upwardly when the user's gaze moves upwardly beyond the predetermined central region of the display panel 120. Here, it is illustrated in FIGS. 5A and 5B that the first resolution of the first image FIM is 1920×1080 and the second resolution of the second image SIM is 2560×1440. For example, it is assumed in FIGS. 5A and 5B that the first image FIM includes 1920 vertical lines and 1080 horizontal lines and the second image SIM includes 2560 vertical lines and 1440 horizontal lines. As described above, the display panel driving circuit 140 may receive the image data SID corresponding to the second image SIM having the second resolution, may receive the user's gaze data UED indicating the user's gaze, and may select the partial image data FID which reflects the user's gaze from the image data SID based on the user's gaze data UED. Thus, a vertical direction region VTP of the image data SID corresponding to the second image SIM may be divided into a first vertical blank region VBP1, an active region ACP, and a second vertical blank region VBP2, and the active region ACP may be determined as the partial image data FID corresponding to the first image FIM. Here, as the user's gaze moves upwardly beyond the predetermined central region of the display panel 120, the vertical center coordinates VCC of the partial image data FID corresponding to the first image FIM may move upwardly. Thus, the first vertical blank region VBP1 may have a size that is smaller than that of the second vertical blank region VBP2. Hence, 1st through 150th horizontal lines Line 1 through Line 150 of the second image SIM may belong to the first vertical blank region VBP1, 1231st through 1440th horizontal lines Line 1231 through Line 1440 of the second image SIM may belong to the second vertical blank region VBP2, and 151st through 1230th horizontal lines Line 151 through Line 1230 of the second image SIM may belong to the active region ACP. In other words, the first vertical blank region VBP1 may include 150 horizontal lines Line 1 through Line 150, the second vertical blank region VBP2 may include 210 horizontal lines Line 1231 through Line 1440, and the active region ACP may include 1080 horizontal lines Line 151 through Line 1230. As a result, the display panel driving circuit 140 may select the partial image data FID corresponding to the first image FIM from the image data SID corresponding to the second image SIM by corresponding (or, matching) the 151st through 1230th horizontal lines Line 151 through Line 1230 (e.g., belonging to the active region ACP) of the second image SIM to 1st through 1080th horizontal lines of the first image FIM.

Figure 6A:
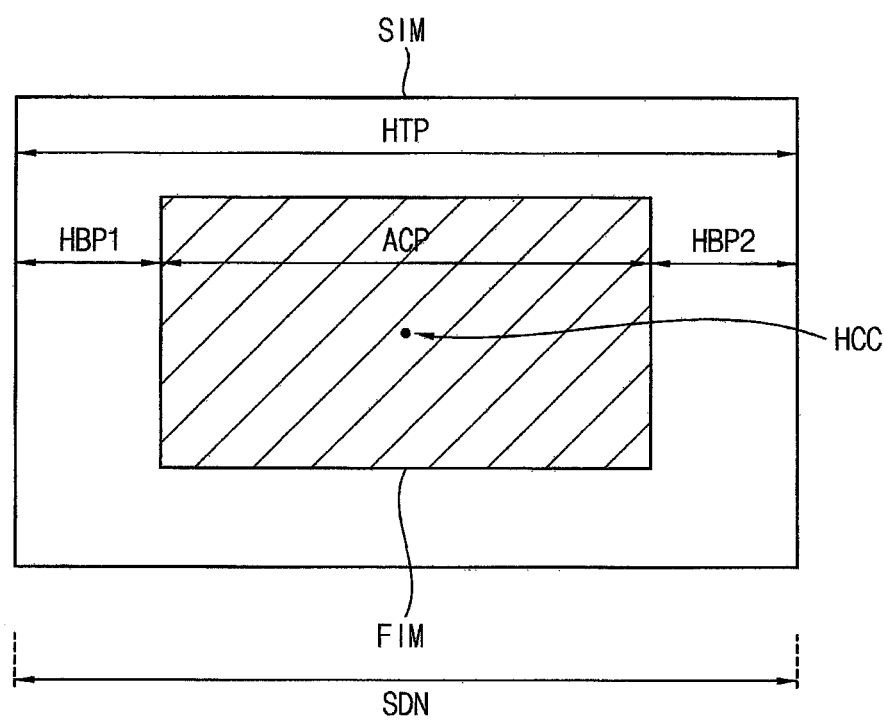
FIGS. 6A and 6B are diagrams illustrating an example in which the display device of FIG. 1 selects a first image from a second image in a horizontal direction when a user views a central region of a display panel.
Figure 6B:
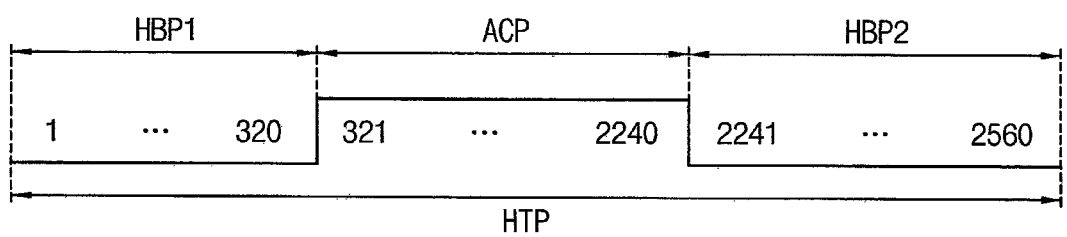

FIGS. 6A and 6B are diagrams illustrating an example in which the display device of FIG. 1 selects a first image from a second image in a horizontal direction when a user views a central region of a display panel.

Referring to FIGS. 6A and 6B, as the user's gaze moves in the horizontal direction SDN on the display panel 120, the horizontal center coordinates HCC of the partial image data FID corresponding to the first image FIM may be determined. FIGS. 6A and 6B show an example in which the horizontal center coordinates HCC of the partial image data FID corresponding to the first image FIM do not move when the user's gaze is located in the predetermined central region of the display panel 120. Here, it is illustrated in FIGS. 6A and 6B that the first resolution of the first image FIM is 1920×1080 and the second resolution of the second image SIM is 2560×1440. For example, it is assumed in FIGS. 6A and 6B that the first image FIM includes 1920 vertical lines and 1080 horizontal lines and the second image SIM includes 2560 vertical lines and 1440 horizontal lines. As described above, the display panel driving circuit 140 may receive the image data SID corresponding to the second image SIM having the second resolution, may receive the user's gaze data UED indicating the user's gaze, and may select the partial image data FID which reflects the user's gaze from the image data SID based on the user's gaze data UED. Thus, a horizontal direction region HTP of the image data SID corresponding to the second image SIM may be divided into a first horizontal blank region HBP1, an active region ACP, and a second horizontal blank region HBP2, and the active region ACP may be determined as the partial image data FID corresponding to the first image FIM. Here, because the user's gaze is located in the predetermined central region of the display panel 120, the horizontal center coordinates HCC of the partial image data FID corresponding to the first image FIM may not move. Thus, the first horizontal blank region HBP1 may have the same size as the second horizontal blank region HBP2. Hence, 1st through 320th vertical lines 1 through 320 of the second image SIM may belong to the first horizontal blank region HBP1, 2241st through 2560th vertical lines 2241 through 2560 of the second image SIM may belong to the second horizontal blank region HBP2, and 321st through 2240th vertical lines 321 through 2240 of the second image SIM may belong to the active region ACP. In other words, the first horizontal blank region HBP1 may include 320 vertical lines 1 through 320, the second horizontal blank region HBP2 may include 320 vertical lines 2241 through 2560, and the active region ACP may include 1920 vertical lines 321 through 2240. As a result, the display panel driving circuit 140 may select the partial image data FID corresponding to the first image FIM from the image data SID corresponding to the second image SIM by corresponding (or, matching) the 321st through 2240th vertical lines 321 through 2240 (e.g., belonging to the active region ACP) of the second image SIM to 1st through 1920th vertical lines of the first image FIM.

Figure 7A:
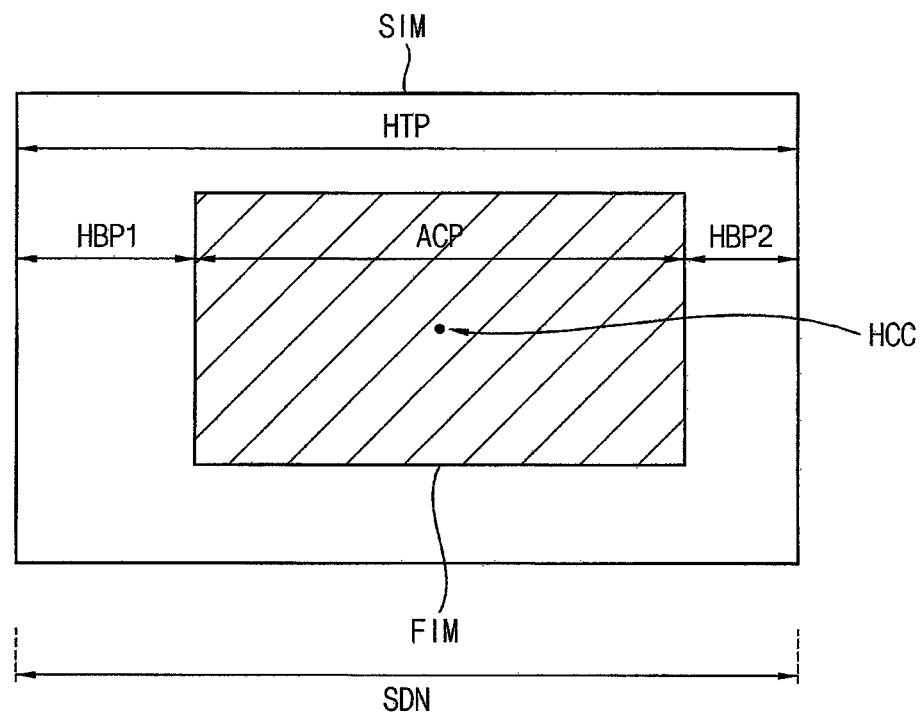
FIGS. 7A and 7B are diagrams illustrating an example in which the display device of FIG. 1 selects a first image from a second image in a horizontal direction when a user views a right region of a display panel.
Figure 7B:
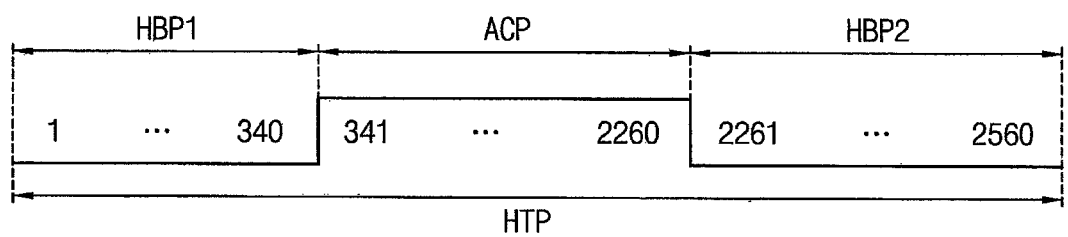

FIGS. 7A and 7B are diagrams illustrating an example in which the display device of FIG. 1 selects a first image from a second image in a horizontal direction when a user views a right region of a display panel.

Referring to FIGS. 7A and 7B, as the user's gaze moves in the horizontal direction SDN on the display panel 120, the horizontal center coordinates HCC of the partial image data FID corresponding to the first image FIM may be determined. FIGS. 7A and 7B show an example in which the horizontal center coordinates HCC of the partial image data FID corresponding to the first image FIM move to the right when the user's gaze moves to the right beyond the predetermined central region of the display panel 120. Here, it is illustrated in FIGS. 7A and 7B that the first resolution of the first image FIM is 1920×1080 and the second resolution of the second image SIM is 2560×1440. For example, it is assumed in FIGS. 7A and 7B that the first image FIM includes 1920 vertical lines and 1080 horizontal lines and the second image SIM includes 2560 vertical lines and 1440 horizontal lines. As described above, the display panel driving circuit 140 may receive the image data SID corresponding to the second image SIM having the second resolution, may receive the user's gaze data UED indicating the user's gaze, and may select the partial image data FID which reflects the user's gaze from the image data SID based on the user's gaze data UED. Thus, a horizontal direction region HTP of the image data SID corresponding to the second image SIM may be divided into a first horizontal blank region HBP1, an active region ACP, and a second horizontal blank region HBP2, and the active region ACP may be determined as the partial image data FID corresponding to the first image FIM. Here, as the user's gaze moves to the right beyond the predetermined central region of the display panel 120, the horizontal center coordinates HCC of the partial image data FID corresponding to the first image FIM may move to the right. Thus, the first horizontal blank region HBP1 may have a size that is bigger than that of the second horizontal blank region HBP2. Hence, 1st through 340th vertical lines 1 through 340 of the second image SIM may belong to the first horizontal blank region HBP1, 2261st through 2560th vertical lines 2261 through 2560 of the second image SIM may belong to the second horizontal blank region HBP2, and 341st through 2260th vertical lines 341 through 2260 of the second image SIM may belong to the active region ACP. In other words, the first horizontal blank region HBP1 may include 340 vertical lines 1 through 340, the second horizontal blank region HBP2 may include 300 vertical lines 2261 through 2560, and the active region ACP may include 1920 vertical lines 341 through 2260. As a result, the display panel driving circuit 140 may select the partial image data FID corresponding to the first image FIM from the image data SID corresponding to the second image SIM by corresponding (or, matching) the 341st through 2260th vertical lines 341 through 2260 (e.g., belonging to the active region ACP) of the second image SIM to 1st through 1920th vertical lines of the first image FIM.

Figure 8A:
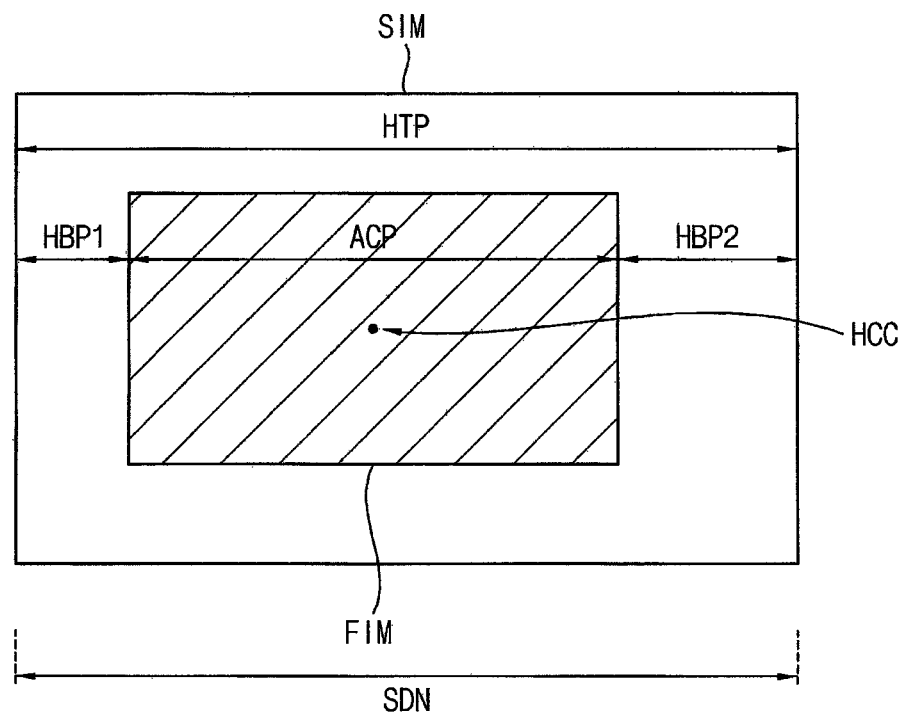
FIGS. 8A and 8B are diagrams illustrating an example in which the display device of FIG. 1 selects a first image from a second image in a horizontal direction when a user views a left region of a display panel.
Figure 8B:
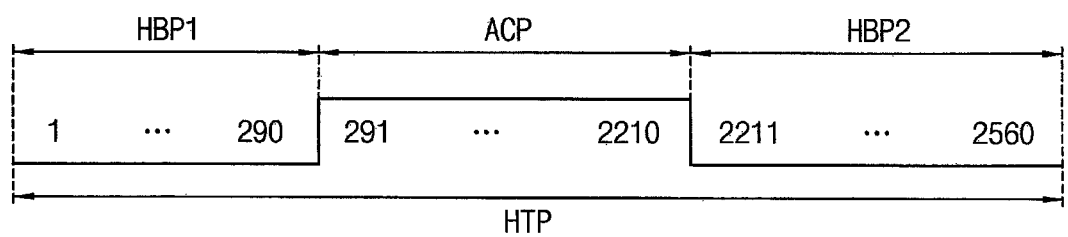

FIGS. 8A and 8B are diagrams illustrating an example in which the display device of FIG. 1 selects a first image from a second image in a horizontal direction when a user views a left region of a display panel.

Referring to FIGS. 8A and 8B, as the user's gaze moves in the horizontal direction SDN on the display panel 120, the horizontal center coordinates HCC of the partial image data FID corresponding to the first image FIM may be determined. FIGS. 8A and 8B show an example in which the horizontal center coordinates HCC of the partial image data FID corresponding to the first image FIM move to the left when the user's gaze moves to the left beyond the predetermined central region of the display panel 120. Here, it is illustrated in FIGS. 8A and 8B that the first resolution of the first image FIM is 1920×1080 and the second resolution of the second image SIM is 2560×1440. For example, it is assumed in FIGS. 8A and 8B that the first image FIM includes 1920 vertical lines and 1080 horizontal lines and the second image SIM includes 2560 vertical lines and 1440 horizontal lines. As described above, the display panel driving circuit 140 may receive the image data SID corresponding to the second image SIM having the second resolution, may receive the user's gaze data UED indicating the user's gaze, and may select the partial image data FID which reflects the user's gaze from the image data SID based on the user's gaze data UED. Thus, a horizontal direction region HTP of the image data SID corresponding to the second image SIM may be divided into a first horizontal blank region HBP1, an active region ACP, and a second horizontal blank region HBP2, and the active region ACP may be determined as the partial image data FID corresponding to the first image FIM. Here, as the user's gaze moves to the left beyond the predetermined central region of the display panel 120, the horizontal center coordinates HCC of the partial image data FID corresponding to the first image FIM may move to the left. Thus, the first horizontal blank region HBP1 may have a size that is smaller than that of the second horizontal blank region HBP2. Hence, 1st through 290th vertical lines 1 through 290 of the second image SIM may belong to the first horizontal blank region HBP1, 2211th through 2560th vertical lines 2211 through 2560 of the second image SIM may belong to the second horizontal blank region HBP2, and 291st through 2210th vertical lines 291 through 2210 of the second image SIM may belong to the active region ACP. In other words, the first horizontal blank region HBP1 may include 290 vertical lines 1 through 290, the second horizontal blank region HBP2 may include 350 vertical lines 2211 through 2560, and the active region ACP may include 1920 vertical lines 291 through 2210. As a result, the display panel driving circuit 140 may select the partial image data FID corresponding to the first image FIM from the image data SID corresponding to the second image SIM by corresponding (or, matching) the 291st through 2210th vertical lines 291 through 2210 (e.g., belonging to the active region ACP) of the second image SIM to 1st through 1920th vertical lines of the first image FIM.

Figure 9:
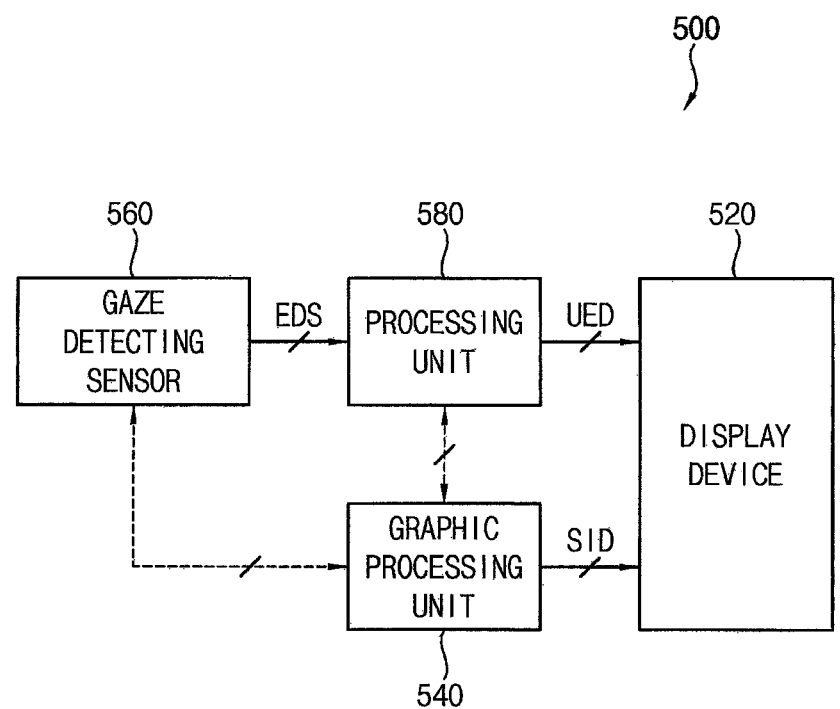
FIG. 9 is a block diagram illustrating a display system according to some example embodiments.
Figure 10:
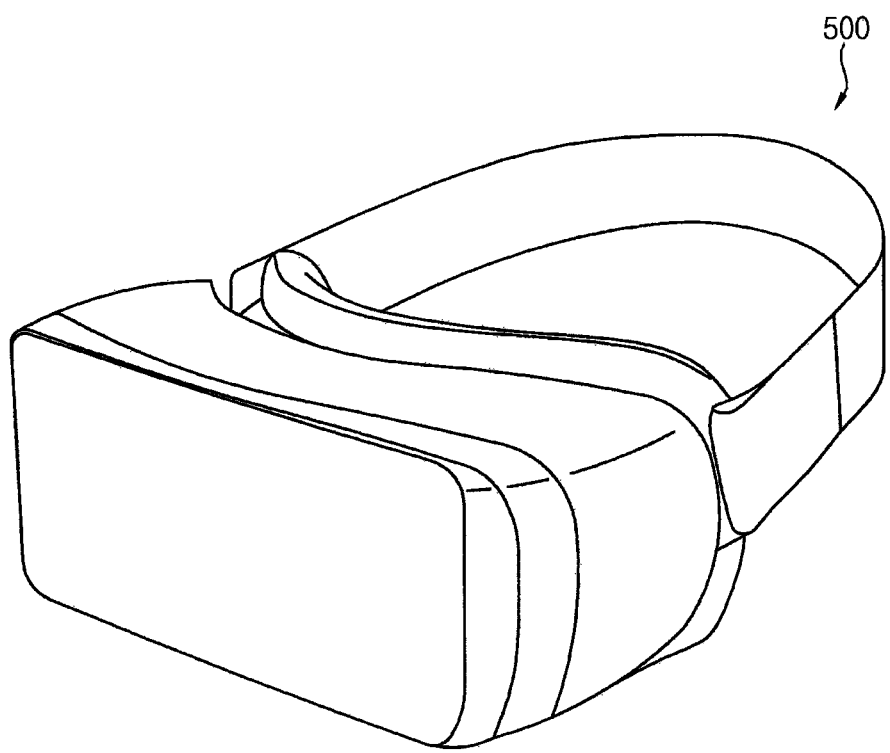
FIG. 10 is a diagram illustrating an example in which the display system of FIG. 9 is implemented as a head mounted display system.
Figure 11:
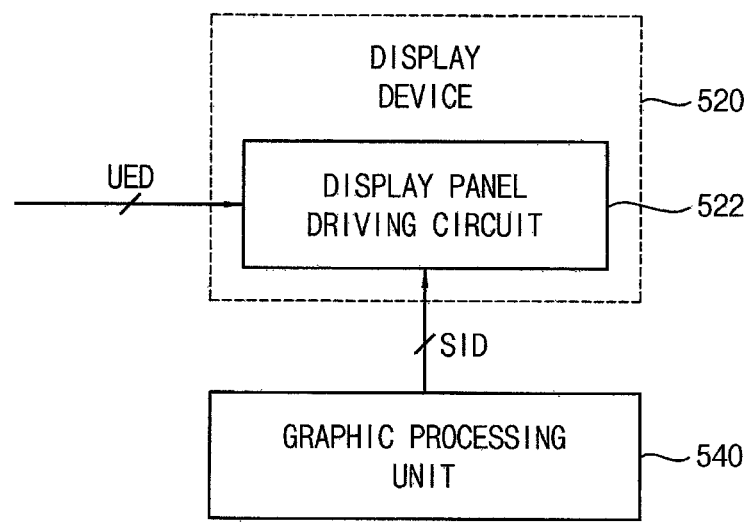
FIG. 11 is a diagram illustrating an example in which a display device interacts with a graphic processing unit in the display system of FIG. 9.
Figure 12:
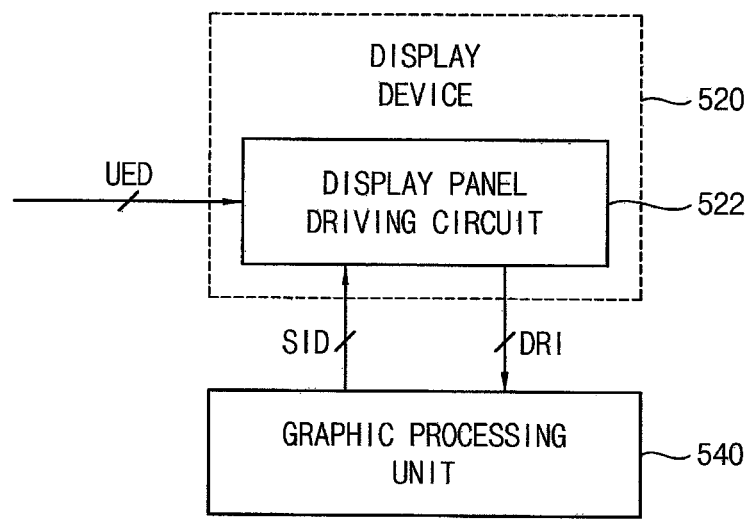
FIG. 12 is a diagram illustrating another example in which a display device interacts with a graphic processing unit in the display system of FIG. 9.

FIG. 9 is a block diagram illustrating a display system according to some example embodiments, FIG. 10 is a diagram illustrating an example in which the display system of FIG. 9 is implemented as a head mounted display system, FIG. 11 is a diagram illustrating an example in which a display device interacts with a graphic processing unit in the display system of FIG. 9, and FIG. 12 is a diagram illustrating another example in which a display device interacts with a graphic processing unit in the display system of FIG. 9.

Referring to FIGS. 9 to 12, the display system 500 may include a display device 520, a graphic processing unit 540, a gaze detecting sensor 560, and a processing unit 580. In an example embodiment, as illustrated in FIG. 11, the display system 500 may be implemented as a head mounted display system 500 (or, a virtual reality system). However, the display system 500 is not limited thereto. For example, the display system 500 may be implemented as a cellular phone, a video phone, a smart pad, a smart watch, a tablet PC, a car navigation system, a television, a computer monitor, a laptop, etc. In some example embodiments, the display system 500 may further include a plurality of ports for communicating with a video card, a sound card, a memory card, a universal serial bus (USB) device, other systems, etc.

The display device 520 may output a first image having a first resolution. The gaze detecting sensor 560 may detect a user's gaze to generate a gaze detection signal EDS and may provide the gaze detection signal EDS to the processing unit 580. The processing unit 580 may generate user's gaze data UED indicating the user's gaze based on the gaze detection signal EDS and may provide the user's gaze data UED to the display device 520. The processing unit 580 may perform various computing functions for operations of the display system 500. The processing unit 580 may be a microprocessor, a central processing unit (CPU), an application processor (AP), etc. The processing unit 580 may be coupled to other components via an address bus, a control bus, a data bus, etc. Further, the processing unit 580 may be coupled to an extended bus such as a peripheral component interconnection (PCI) bus. The graphic processing unit 540 may generate image data SID corresponding to a second image having a second resolution that is higher than the first resolution of the first image that the display device 520 outputs and may provide the image data SID to the display device 520. Here, data communication may be performed between the graphic processing unit 540 and the display device 520 using a given interface. For example, the graphic processing unit 540 may transmit the image data SID corresponding to the second image having the second resolution to the display device 520 using an embedded display port (eDP) interface. However, an interface between the graphic processing unit 540 and the display device 520 is not limited thereto.

In some example embodiments, the display system 500 may further include a memory device, a storage device, a power supply, etc. The memory device and the storage device may store data for operations of the display system 500. For example, the memory device may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device may include a solid state drive (SSD) device, a hard disk drive (HDD) device, a CD-ROM device, etc. The power supply (e.g., a battery) may provide power for operations of the display system 500.

As described above, the display device 520 may receive the user's gaze data UED indicating the user's gaze from the processing unit 580, may receive the image data SID corresponding to the second image having the second resolution from the graphic processing unit 540, and may output the first image having the first resolution by reflecting the user's gaze based on the user's gaze data UED and the image data SID. To this end, the display panel driving circuit 522 may receive the image data SID from the graphic processing unit 540, may receive the user's gaze data UED from the processing unit 580, and may select partial image data which reflects the user's gaze from the image data SID based on the user's gaze data UED. In an example embodiment, the display panel driving circuit 522 may select the partial image data so that the user's gaze may be located in a central region of the first image. Here, horizontal center coordinates of the partial image data may be determined as the user's gaze moves in a horizontal direction on the display panel. For example, when the user's gaze is located in a predetermined central region of the display panel, the horizontal center coordinates of the partial image data may not move. When the user's gaze moves to the left beyond the predetermined central region of the display panel, the horizontal center coordinates of the partial image data may move to the left. When the user's gaze moves to the right beyond the predetermined central region of the display panel, the horizontal center coordinates of the partial image data may move to the right. In addition, vertical center coordinates of the partial image data may be determined as the user's gaze moves in a vertical direction on the display panel. For example, when the user's gaze is located in the predetermined central region of the display panel, the vertical center coordinates of the partial image data may not move. When the user's gaze moves upwardly beyond the predetermined central region of the display panel, the vertical center coordinates of the partial image data may move upwardly. When the user's gaze moves downwardly beyond the predetermined central region of the display panel, the vertical center coordinates of the partial image data may move downwardly. Since these operations are described above, duplicated description will not be repeated.

In an example embodiment, as illustrated in FIG. 11, the graphic processing unit 540 may provide the image data SID to the display device 520, but may not receive any feedback relating to the user's gaze from the display device 520. In other words, the graphic processing unit 540 may generate the image data SID, regardless of the change of the user's gaze. In another example embodiment, as illustrated in FIG. 12, the graphic processing unit 540 may receive information DRI relating to the user's gaze data UED or information DRI relating to the user's gaze that the first image reflects from the display device 520 while providing the image data SID to the display device 520. Thus, the graphic processing unit 540 may generate the image data SID by reflecting the change of the user's gaze based on the feedback relating to the user's gaze, where the feedback relating to the user's gaze is received from the display device 520. In other words, the graphic processing unit 540 may reflect the change of the user's gaze in generating (or, performing rendering) next image data SID. As described above, the display device 520 may prevent or reduce a delay due to image data rendering of the graphic processing unit 540 from occurring between a time point at which the user's gaze is changed and a time point at which the image which reflects the changed user's gaze is displayed by receiving the image data SID corresponding to the second image having the resolution (e.g., the second resolution) that is higher than the resolution (e.g., the first resolution) of the first image to be displayed on the display panel, by receiving the user's gaze data UED indicating the user's gaze, by selecting the partial image data which reflects the user's gaze from the image data SID based on the user's gaze data UED, and by displaying the first image based on the partial image data. As a result, the display system 500 including the display device 520 may prevent or reduce instances of a user feeling dizziness due to the gaze-change in experiencing virtual reality.

The present inventive concept may be applied to a display device and a display system including the display device. For example, the present inventive concept may be applied to a cellular phone, a smart phone, a video phone, a smart pad, a tablet PC, a car navigation system, a television, a computer monitor, a laptop, a digital camera, an HMD system, a VR system, etc.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

The foregoing is illustrative of example embodiments and is not to be construed as limiting thereof. Although a few example embodiments have been described, those skilled in the art will readily appreciate that many modifications are possible in the example embodiments without materially departing from the novel teachings and aspects of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and their equivalents.

What is claimed is:

1. A display device comprising:
a display panel configured to display a first image having a first resolution; and
a display panel driving circuit configured to drive the display panel,
wherein the display panel driving circuit is configured to receive image data corresponding to a second image having a second resolution that is higher than the first resolution, to receive gaze data indicating a user's gaze, to select partial image data which reflects the user's gaze from the image data based on the gaze data, and to drive the display panel to display the first image based on the partial image data, wherein the display device is configured to maintain center coordinates of the first image in response to the gaze data indicating a movement of the user's gaze that is still inside a predetermined central region, and the display device is configured to adjust the center coordinates of the first image such that the first image is adjusted to move relative to the second image in a display area of the display panel such that a location of a high resolution region of a composite image formed by the first and second images is adjusted in response to the gaze data indicating a movement of the user's gaze to outside of the predetermined central region.

2. The display device of claim 1, wherein the display panel driving circuit is configured to select the partial image data to locate the user's gaze in the predetermined central region.

3. The display device of claim 2, wherein horizontal center coordinates of the partial image data are determined as the user's gaze moves in a horizontal direction on the display panel.

4. The display device of claim 3, wherein the horizontal center coordinates do not move when the user's gaze is located in the predetermined central region.

5. The display device of claim 4, wherein the horizontal center coordinates move to the left when the user's gaze moves to the left beyond the predetermined central region.

6. The display device of claim 4, wherein the horizontal center coordinates move to the right when the user's gaze moves to the right beyond the predetermined central region.

7. The display device of claim 2, wherein vertical center coordinates of the partial image data are determined as the user's gaze moves in a vertical direction on the display panel.

8. The display device of claim 7, wherein the vertical center coordinates do not move when the user's gaze is located in the predetermined central region.

9. The display device of claim 8, wherein the vertical center coordinates move upwardly when the user's gaze moves upwardly beyond the predetermined central region.

10. The display device of claim 8, wherein the vertical center coordinates move downwardly when the user's gaze moves downwardly beyond the predetermined central region.

11. A display system comprising:
a display device configured to output a first image having a first resolution;
a gaze detecting sensor configured to detect a user's gaze to generate a gaze detection signal;
a processing unit configured to generate gaze data indicating the user's gaze based on the gaze detection signal; and
a graphic processing unit configured to generate image data corresponding to a second image having a second resolution that is higher than the first resolution,
wherein the display device is configured to receive the gaze data from the processing unit, to receive the image data from the graphic processing unit, and to output the first image by reflecting the user's gaze based on the gaze data and the image data,
wherein the display device is configured to maintain center coordinates of the first image in response to the gaze data indicating a movement of the user's gaze that is still inside a predetermined central region, and the display device is configured to adjust the center coordinates of the first image such that the first image is adjusted to move relative to the second image in a display area of the display device such that a location of a high resolution region of a composite image formed by the first and second images is adjusted in response to the gaze data indicating a movement of the user's gaze to outside of the predetermined central region.

12. The display system of claim 11, wherein the display device is configured to provide information relating to the gaze data or information relating to the user's gaze which the first image reflects to the graphic processing unit.

13. The display system of claim 11, wherein the display device includes:
a display panel configured to display the first image; and
a display panel driving circuit configured to receive the image data, to receive the gaze data, to select partial image data which reflects the user's gaze from the image data based on the gaze data, and to drive the display panel to display the first image based on the partial image data.

14. The display system of claim 13, wherein the display panel driving circuit is configured to select the partial image data to locate the user's gaze in a central region of the first image.

15. The display system of claim 14, wherein horizontal center coordinates of the partial image data are determined as the user's gaze moves in a horizontal direction on the display panel.

16. The display system of claim 15, wherein the horizontal center coordinates do not move when the user's gaze is located in the predetermined central region.

17. The display system of claim 16, wherein the horizontal center coordinates move to the left when the user's gaze moves to the left beyond the predetermined central region, and
wherein the horizontal center coordinates move to the right when the user's gaze moves to the right beyond the predetermined central region.

18. The display system of claim 14, wherein vertical center coordinates of the partial image data are determined as the user's gaze moves in a vertical direction on the display panel.

19. The display system of claim 18, wherein the vertical center coordinates do not move when the user's gaze is located in the predetermined central region.

20. The display system of claim 19, wherein the vertical center coordinates move upwardly when the user's gaze moves upwardly beyond the predetermined central region, and
wherein the vertical center coordinates move downwardly when the user's gaze moves downwardly beyond the predetermined central region.

* * * * *